(12) United States Patent
Tov et al.

(10) Patent No.: US 11,417,064 B2
(45) Date of Patent: Aug. 16, 2022

(54) METHOD, APPARATUS AND SYSTEM FOR MAPPING AN INCIDENT TYPE TO DATA DISPLAYED AT AN INCIDENT SCENE

(71) Applicant: MOTOROLA SOLUTIONS, INC, Chicago, IL (US)

(72) Inventors: Jacob Shem Tov, Jerusalem (IL); Shahar Kuchuk, Ariel (IL); Kenneth A. Haas, Sleepy Hollow, IL (US); David Mizrachi, Tel Aviv (IL); Vered Rabaev, Rosh Haayin (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 464 days.

(21) Appl. No.: 16/030,891

(22) Filed: Jul. 10, 2018

(65) Prior Publication Data
US 2020/0020160 A1    Jan. 16, 2020

(51) Int. Cl.
| | | |
|---|---|---|
| *G06T 19/00* | (2011.01) | |
| *G06Q 50/26* | (2012.01) | |
| *G06F 16/583* | (2019.01) | |
| *G06V 10/94* | (2022.01) | |
| *G06V 40/16* | (2022.01) | |

(52) U.S. Cl.
CPC ........ *G06T 19/006* (2013.01); *G06F 16/5854* (2019.01); *G06Q 50/265* (2013.01); *G06V 10/95* (2022.01); *G06V 40/172* (2022.01); *G06T 2219/004* (2013.01)

(58) Field of Classification Search
CPC ............................ G06T 19/006; G05D 1/0088
See application file for complete search history.

(56) References Cited

U.S. PATENT DOCUMENTS

| | | | |
|---|---|---|---|
| 6,405,213 B1 | 6/2002 | Layson et al. | |
| 2003/0210228 A1 | 11/2003 | Ebersole | |
| 2016/0021025 A1* | 1/2016 | Patel | ...................... H04L 47/823 |
| | | | 370/329 |
| 2016/0148110 A1* | 5/2016 | Manthey | ................. G06N 5/048 |
| | | | 706/1 |
| 2016/0327798 A1 | 11/2016 | Xiao | |
| 2018/0018861 A1* | 1/2018 | Locke | ................ G06K 9/00671 |
| 2018/0157259 A1* | 6/2018 | Myslinski | .............. G08B 21/18 |

* cited by examiner

*Primary Examiner* — Yi Yang

(57) ABSTRACT

A method and apparatus for displaying data at an incident scene is provided herein. During operation an officer will be assigned to a particular incident having an identified "incident type". Individuals at the incident scene are identified via facial recognition and criminal histories for all recognized individuals are obtained. The incident type will be used to determine criminal histories relevant to the incident type. Only the criminal histories of those individuals at the incident scene that are relevant to the incident type will be displayed (ideally displayed proximate to the identified individuals).

11 Claims, 6 Drawing Sheets

METHOD, APPARATUS AND SYSTEM FOR MAPPING AN INCIDENT TYPE TO DATA DISPLAYED AT AN INCIDENT SCENE

BACKGROUND OF THE INVENTION

An officer arriving to an incident scene needs to get a clear view of the scene in order to be able to perform their tasks. In many public-safety incidents, there are many individuals on scene, and it may be beneficial for the officer to know if any persons on scene are related to the particular incident. For example, assume an officer is dispatched to a scene where an individual was shot. The officer arrives on scene to find 20 individuals and potential witnesses surrounding the victim. It would be beneficial to the officer if somehow data on the 20 individuals can be displayed at an incident scene.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
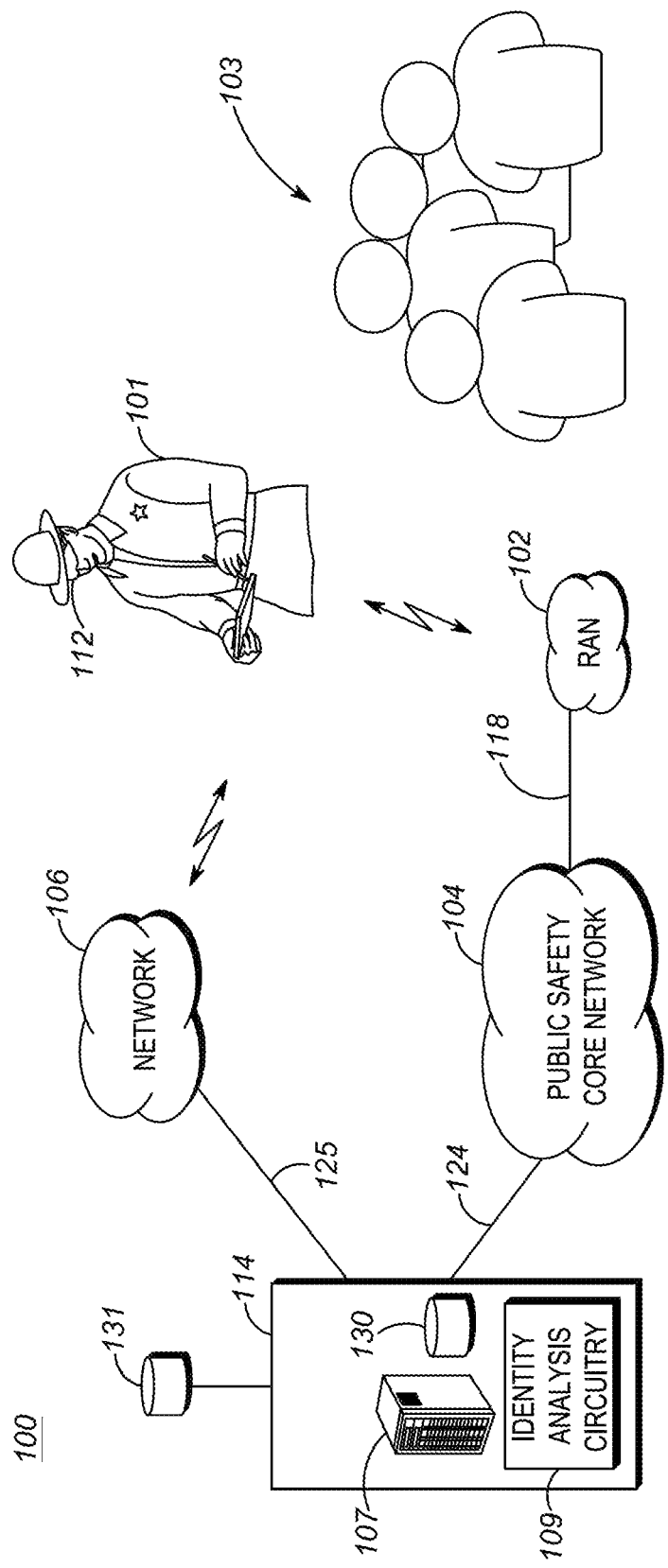
FIG. 1 shows a general operating environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for displaying data at an incident scene is provided herein. During operation an officer will be assigned to a particular incident having an identified "incident type". Individuals at the incident scene are identified via facial recognition and criminal histories for all recognized individuals are obtained. The incident type will be used to determine criminal histories relevant to the incident type. Only the criminal histories of those individuals at the incident scene that are relevant to the incident type will be displayed (ideally displayed proximate to the identified individuals).

The displayed information will ideally be used to augmented an officer's device in a way that he will have clear view of any potential suspects or dangerous individuals. For example, the officer may be carrying a camera, or an augmented-reality vision system that will place virtual objects near/over individuals with a relevant criminal past. For example, individuals with relevant criminal histories may be highlighted while individuals without relevant criminal histories may be faded from view.

As an example, consider a situation where an officer is dispatched to a residence for a domestic dispute. The officer arrives on scene and finds many family members on scene. A particular individual has been identified as someone who has a past domestic abuse charge against him. Another individual has been identified as a person who has a past shoplifting charge against her. Since domestic abuse charges are relevant to this incident, the individual having the past domestic abuse charge against him will be highlighted, while the individual who has the past shoplifting charge will not be highlighted.

As is evident, only certain individuals with criminal histories relevant to the incident are highlighted. This prevents the officer being overwhelmed with data, while still identifying those individuals with particular relevance to the incident. For example, consider the situation where an officer is sent to a large fire. When the officers arrive, there may be many dozens of individuals witnessing the fire. One of those individuals has a history of arson. It would be beneficial if that individual was identified clearly, without the officer having to look through criminal histories of everyone on scene.

In a first embodiment, individuals are highlighted via an augmented-reality system. Augmented reality systems utilizes a technology that superimposes a computer-generated image on a user's view of the real world, thus providing a composite view of the real world and the computer-generated image. During operation, a user's surroundings will appear on a device, with the surroundings "augmented" as part of the view provided to a user. During operation individuals may be highlighted with various text, outlines, colors, shapes, . . . , etc. based on the individual's criminal history, and if it is deemed relevant to the incident scene. Such forms of highlighting include, but are not limited to:

placing a shape having a particular color around an individual based the individual's criminal past being relevant to a current incident. For example, a yellow box may be placed around with a relevant criminal past.

shading the individual in a particular color based the individual's criminal past being relevant to a current incident. For example, a yellow shading may be placed over individuals with a relevant criminal past.

placing an object on an individual based on the individual's criminal past being relevant to a current incident. For example, a yellow box may be placed on individuals with a relevant criminal past.

varying an intensity of an individual based the individual's criminal past being relevant to a current incident. For example, those with a relevant criminal past may be shown with a high intensity (Bold) and others will be faded.

placing text in proximity to individuals based the individual's criminal past being relevant to a current incident. For example, those with a relevant criminal past may be shown with text identifying the criminal past (e.g., "known gang member").

The following definitions are provided to set the necessary background for utilization of the preferred embodiment of the present invention.

Public-Safety Incident—An event or occurrence that involves first responders e.g., (police, fire, military, coastguard, . . . etc.). Such occurrences include, but are not limited to a fire, a crime, a weather-related event such as a lightning strike, an automobile accident, suspicious activity, graffiti, . . . , etc.

Public-Safety Incident Scene—A geographic area surrounding a public-safety incident.

Augmented-Reality Application—Any program or system that superimposes a computer-generated image on a user's view of the real world, thus providing a composite view of the real world and computer-generated image. During execution of such an application, a user's surroundings will appear on a device, with the surroundings "augmented" with images created by the application. Other examples of augmented-reality applications are applications such as a "find-my-car" application for parking lots, mapping applications for route planning, . . . , etc.

Image—a video, picture, or live feed of an object or area.

Virtual Object—An object that is virtual as opposed to real. Such an object may exist as part of an augmented-reality system and used to identify individuals with a criminal past that is relevant to a current incident.

Augmented-Reality Device—A preferably-mobile device that runs an augmented-reality application that places a virtual object or highlighting on individuals as part of an augmented-reality system. The virtual object or highlighting is dependent on the individual's criminal past being relevant to a current incident.

Turing now to the drawings wherein like numerals designate like components, FIG. 1 is a general operating environment 100 for the present invention. Environment 100 includes one or more radio access networks (RANs) 102, a public-safety core network 104, augmented-reality device 112, dispatch center 114, and communication links 125, 118, 124. In a preferred embodiment of the present invention, dispatch center 114 serves as a public-safety dispatch center 114. Server 107 provides the necessary augmented-reality data to an augmented-reality application running on device 112. It should be noted that the term "server" and "logic circuitry" can be used interchangeably, and simply mean circuitry that provides data so that device 112 can highlight individuals as described above.

Server 107 is coupled to system database 130. Database 130 comprises information necessary for server 107 to appropriately provide augmented-reality views to officer 101 via device 112. For example, database 130 may comprise officer information, officer locations, virtual-object locations, . . . , etc. It should be noted that although only one server 107 is shown coupled to database 130, there may exist many servers 107 providing system services to officers, with each server 107 sharing database 130 (or a copy of database 130).

Communication between server 107 and device 112 takes place through an intervening network such as, but not limited to a high-speed data network 106 such as a cellular communication system. Thus, as shown in FIG. 1, two separate networks exist, namely public-safety core network 104 for carrying voice traffic from police radios, and a high-speed network 106 (e.g., Verizon, Spring, AT&T, . . . , etc.) for carrying augmented-reality data.

Each RAN 102 includes typical RAN elements such as base stations, base station controllers (BSCs), routers, switches, and the like, arranged, connected, and programmed to provide wireless service to user equipment (e.g., a police radio (not shown in FIG. 1) operated by officer 101) in a manner known to those of skill in the relevant art.

In a similar manner, network 106 includes elements such as base stations, base station controllers (BSCs), routers, switches, and the like, arranged, connected, and programmed to provide wireless service and data to user equipment (e.g., augmented-reality glasses 112 operated by user 101) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications. Augmented-reality device 112 may be any suitable computing and communication devices configured to engage in wireless communication over an air interface as is known to those in the relevant art. Augmented-reality device 112 comprises any device capable of running an augmented-reality application for projecting and/or displaying an augmented-reality scene from data obtained from server 107. For example, officer devices 112 may comprise a mobile device running an Android™ or iOS™ operating system and having a GPS receiver capable of determining a location. Such devices include, but are not limited to an augmented-reality headset 112 or a smartphone.

Database 131 comprises a criminal database comprising images of individuals and past criminal activity. Database 131 also comprises a mapping of incident types to "relevant" criminal history. For example, database 131 preferably comprises Table 1, shown below:

TABLE 1

Mapping of incident type to relevant criminal histories.

| Incident Type | Relevant Criminal Histories |
| --- | --- |
| Arson | Arson |
| Battery | Assault, Battery, Intimidation, fleeing, gang affiliation |
| Domestic Dispute | Domestic violence, assault, battery |
| . . . | . . . |

Identity Analysis circuitry 109 will receive images of individuals 103 (sent from device 112) and compare the images to those in database 131 in order to identify individuals 103. Once identified, a criminal history for the individual is obtained from database 131. Preferably, identity analysis circuitry utilized facial-recognition technology to identify individuals by comparing images/video taken of them at the incident scene to images stored in database 131.

Identity analysis circuitry 109 comprises circuitry used to perform facial recognition on individuals at an incident scene. During operation, images of individuals 103 are provided to identity analysis circuitry 109 (from, for example, device 112). Circuitry 109 accesses database 131 to compare an images of unidentified individuals 103 with those images within database 131. (It should be noted that in an alternate embodiment of the present invention the database (or significant portion) is on-site, residing within dispatch center 114).

Thus, during operation, responder 101 is assigned to a particular incident and will show up at an incident scene. Device 112 will provide an image of the scene (including unidentified individuals) to analysis circuitry 109. Identity analysis circuitry 109 will compare the image of the unidentified individuals 103 to those in database 131. If a match is made, criminal history is determined from database 131 for the identified individual(s). This information is provided to server 107 and stored in database 130. Server 107 will also receive an incident identifier from dispatch center 113. Server 107 will transmit augmented-reality data to device 112 so that individuals may be appropriately highlighted by an augmented-reality application residing on device 112. This data comprises such information text, shapes, highlighting, individual locations within the image, . . . , etc.

Figure 2:
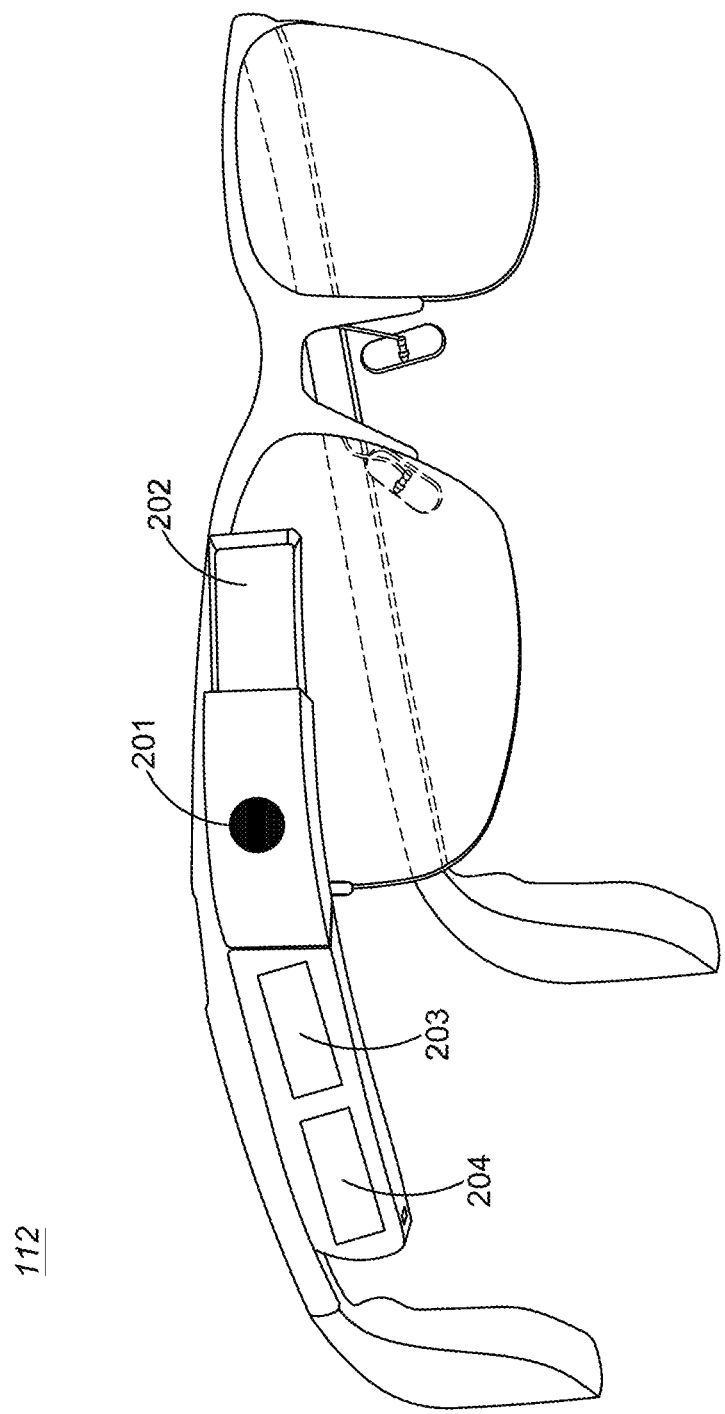
FIG. 2 illustrates an augmented-reality device of FIG. 1.

As discussed above, in order not to overwhelm officer 112 with data, only individuals with relevant criminal histories (i.e., criminal histories relevant to the current FIG. 2 illustrates augmented-reality device 112. As shown, device 112 comprises camera 201, virtual-object projector 202, location circuitry (e.g., a GPS receiver) 203, and a transceiver 204. It should be noted that in other augmented-realty devices, projector 202 may be replaced by a screen, such as a touch screen, for displaying an augmented-reality view. During operation camera 201 acquires an image of individuals 103 and location circuitry 203 determines a current location. Both the image of individuals 103 and a location of device 112 are sent to transceiver 204 which sends the image and location to dispatch center 114. In response, transceiver 204 receives augmented-reality data comprising, for example, virtual objects to place over individuals. Projector 202 then projects the image accordingly, with individuals highlighted/shaded as described above.

Figure 3:
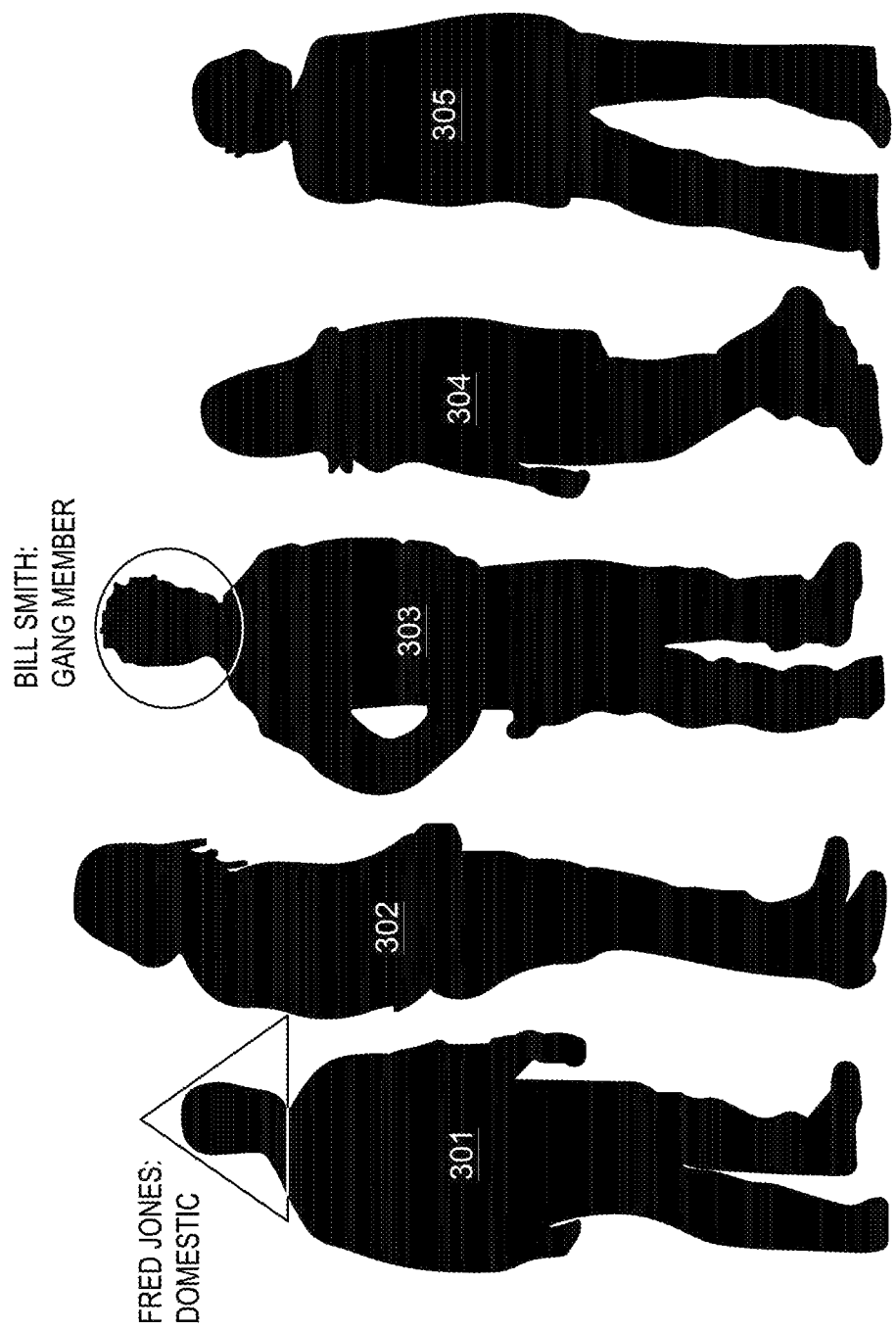
FIG. 3 illustrates the placement of a virtual object over an individual based on a distance from an incident scene to a residence.

FIG. 3 illustrates the placement of a virtual object over individuals based on a relevance of criminal history to a particular incident. In this example, individuals 301-305 have been identified. Individuals 301 and 303 have a criminal past that is relevant to the current incident. As shown, individuals 301 and 303 will be highlighted accordingly. It should be noted that individuals 302, 304, and 305 may also have criminal histories, however, their criminal histories are not displayed because they are deemed not relevant to the current incident.

Figure 4:
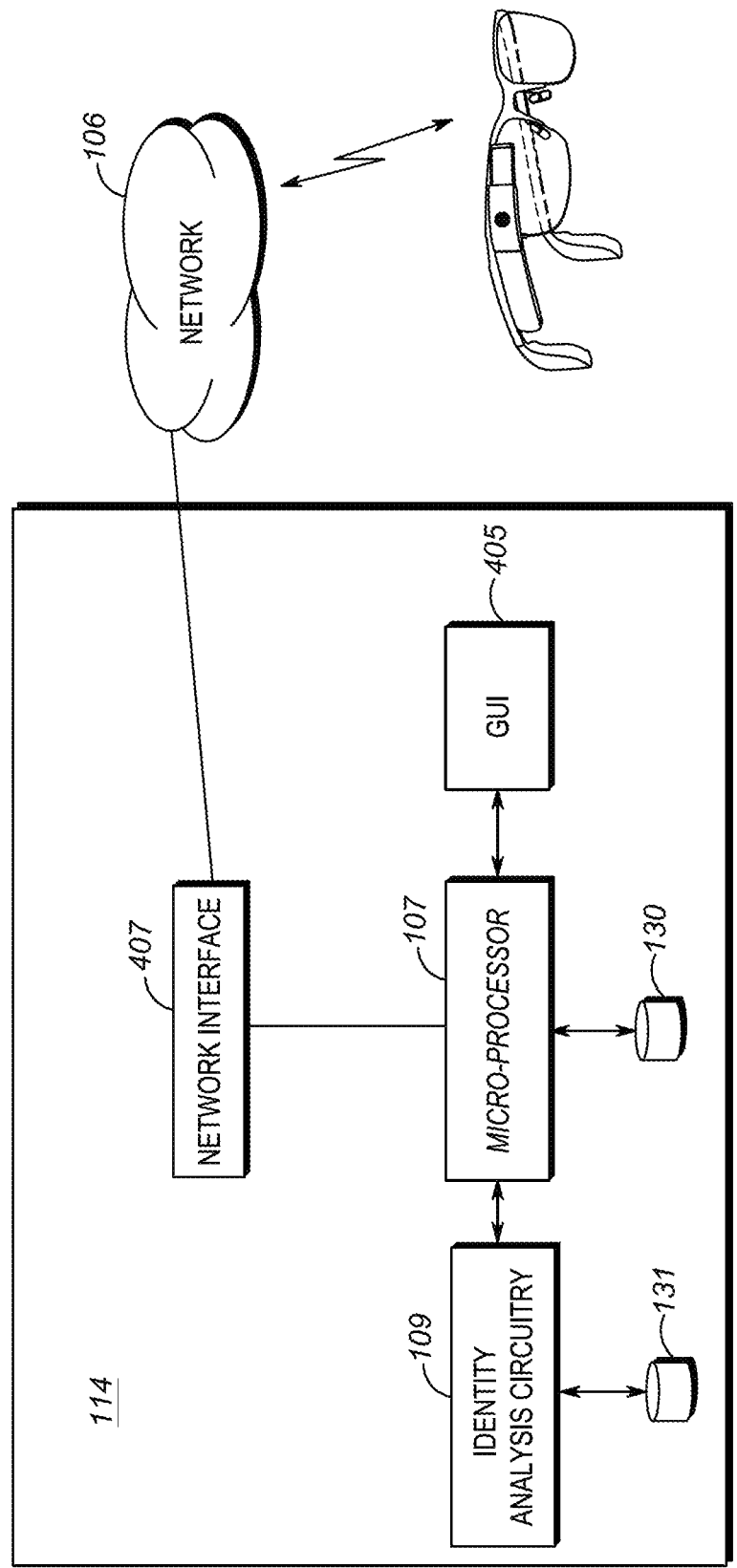
FIG. 4 is a block diagram of a dispatch center of FIG. 1.

FIG. 4 is a block diagram of the dispatch center of FIG. 1. As shown, dispatch center 114 may include network interface 407, which may be wired or wireless. If wireless, network interface 407 comprises at least an over-the-air transmitter and a receiver. Dispatch center 114 also includes graphical-user interface (GUI) 405, logic circuitry 107, and databases 130 and 131 (in this example database 131 is shown internal to dispatch center 114). In other implementations, dispatch center 114 may include more, fewer, or different components.

Graphical-User Interface (GUI) 405 comprises a screen (e.g., a liquid crystal display (LCD), organic light-emitting diode (OLED) display, surface-conduction electro-emitter display (SED), plasma display, field emission display (FED), bistable display, projection display, laser projection, holographic display, etc.) that can display images, maps, incident data, . . . , etc. The input to GUI 405 may be input via a human operator from information obtained, for example, from a 911 emergency call. Such information may comprise information on an incident such as, but not limited to, a location of the incident, a severity of the incident, a type of incident, . . . , etc. In order to provide the above features (and additional features), GUI 405 may include a monitor, a keyboard, a mouse, and/or various other hardware components to provide a man/machine interface.

In one embodiment of the present invention, a computer-aided dispatch (CAD) incident identifier (ID) is utilized to classify a type of incident and determine relevant criminal pasts. The CAD_ID may be input by an operator at GUI 405. The CAD_ID is input or generated for incidents where an officer is dispatched. This ID could be something as simple as a number, or something as complicated as an identification that is a function of populated fields, one of which may comprise an incident type.

Logic circuitry 107 serves as server 107 and comprises a digital signal processor (DSP), general purpose microprocessor, a programmable logic device, or application specific integrated circuit (ASIC) and is utilized to receive an image from device 112 and send appropriate augmented-reality data so that individuals can be highlighted as described above. As discussed above, the augmented-reality data preferably comprises virtual objects placed near individuals having a criminal history relevant to the current incident type.

Databases 130 and 131 comprise standard random-access memory. As discussed above, database 130 comprises augmented-reality data such as virtual objects, locations of virtual objects, . . . , etc. Database 131 comprises images of individuals along with their past criminal histories.

In an illustrative embodiment, network 106 is attached (i.e., connected) to dispatch center 114 through network interface 407 and communicates with processor 107. Network 106 is connected via a wired or wireless connection to network interface 407. Network interface 407 includes elements including processing, modulating, and transceiver elements that are operable in accordance with any one or more standard or proprietary wired or wireless interfaces, wherein some of the functionality of the processing, modulating, and transceiver elements may be performed by means of processor 107.

In the illustrative embodiment, network 104 is attached (i.e., connected) to dispatch center 114 through a transmitter and receiver (not shown in FIG. 4), both of which communicate with processor 107. Network 104 is connected to dispatch center 114 via a wireless connection, although this connection may be wired in alternate embodiments.

In the illustrative embodiment, officer devices 112 are attached (i.e., connected) to server 107 through network interface 407 and communicate with processor 107. Network interface 407 is configured to receive an image of individuals from device 112. Network interface 407 is also configured to forward augmented reality data to device 112.

Figure 5:
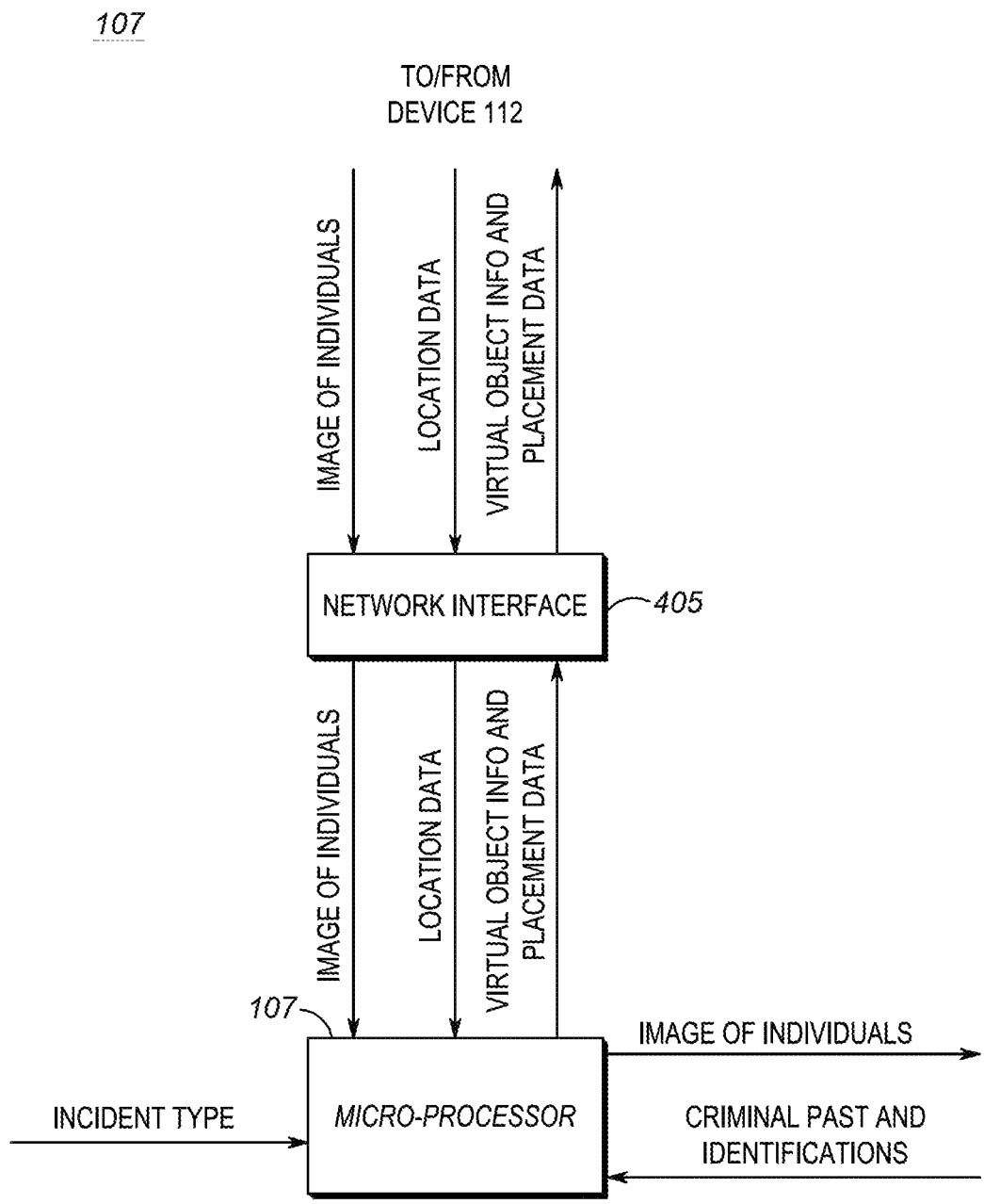
FIG. 5 illustrates data flowing to and from a dispatch center.

FIG. 5 illustrates data flowing to and from dispatch center 114 and to and from device 112. As shown, an image of individuals is received from device 112 at network interface 405 and passed to logic circuitry 107. Location data may also be received from device 112 at network interface 405 and passed to server 107.

An incident type is also received by logic circuitry 107. The incident type may be received from GUI 405. In response to receiving the image, the location data, and the incident type, logic circuitry 107 accesses circuitry 109 to identify individuals on scene and obtain their criminal pasts. In particular, images of individuals on scene are passed to analysis circuitry 109 and identifications and criminal histories of those individuals are obtained.

Logic circuitry 107 will then map the incident type to relevant criminal pasts. More specifically, if an incident type x is an element of possible incident types X (i.e., x∈X), we say that f "takes the value" or "maps to" f(x) at x. The set X is called the domain of the function f. The set of possible outcomes of f(x) is called the range. The domain is the set of possible arguments f, and the range is the set of possible outcomes f can take. The mapping may be explicit based on predefined rules (as shown in Table 1), or the mapping may be trained via neural network modeling. The mapping process preferably comprises an operation that associates each element of a given set (the domain) with one or more elements of a second set (the range). The public-safety incident type assigned to the officer comprises the domain, while the relevant criminal pasts comprise the range. For example, y=F(x), where y is the range and x is the domain. If y is the relevant criminal pasts (range) and public-safety incident type comprises the domain, then:
Relevant Criminal Pasts=Function(incident type).

Once individuals are identified, their criminal pasts determined, and relevant criminal pasts determined, virtual object information along with placement data is output to device 112. The virtual object information may comprise such information as text, a "yellow square", "red circle", ..., etc. The placement data also comprises information on where to place the virtual object (e.g., identity of a particular individual, x and y coordinates, ..., etc.).

Thus, FIG. 4 and FIG. 5 provide for an apparatus comprising a network interface configured to receive an image of an individual from a device, a database comprising facial information and criminal information, identity analysis circuitry configured to use the facial information for performing facial recognition on the image of the individual to determine an identity of the individual and their past criminal activity, and logic circuitry configured to receive a current incident type assigned to a public-safety officer and determine those incident types relevant to the current incident type, and also configured to determine if the past criminal activity matches the incident types relevant to the current incident type, and determine augmented-reality data based on the past criminal activity matching the incident types relevant to the current incident type. The network interface is also configured to transmit the augmented-reality data to the device.

The network interface can comprise a wireless or a wired network interface.

The augmented-reality data can comprise text, a geometric shape, a color, and/or a shading.

The augmented-reality data also instructs the device to place a virtual object near the individual if they have a criminal history that contains an incident type relevant to the current incident type.

Figure 6:
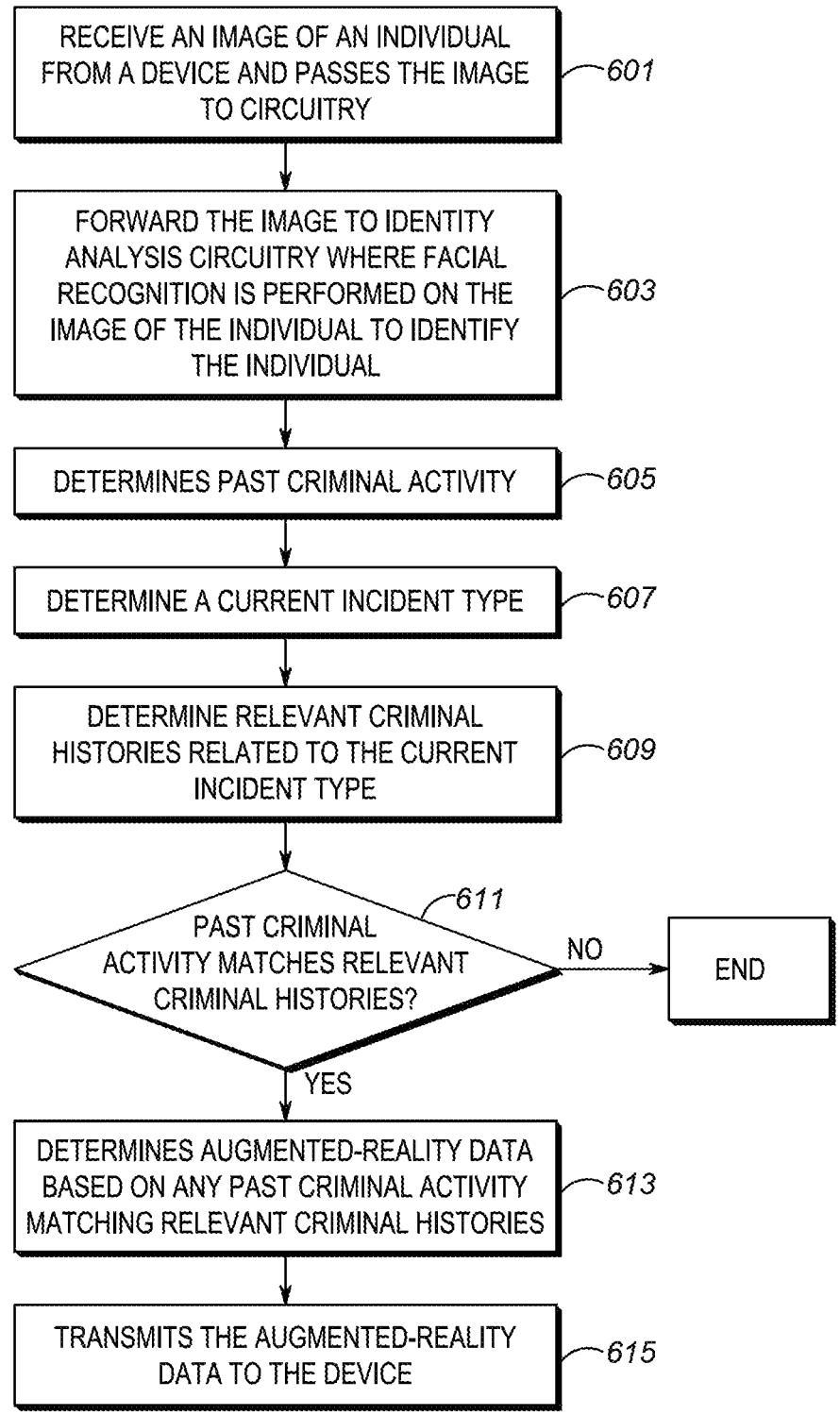
FIG. 6 is a flow chart showing operation of the dispatch center of FIG. 4.

FIG. 6 is a flow chart showing operation of dispatch center 114. The logic flow begins at step 601 where network interface 407 receives an image of an individual from a device and passes the image to circuitry 107. At step 603, circuitry 107 forwards the image to identity analysis circuitry 109 where facial recognition is performed on the image of the individual to identify the individual. Circuitry 109 also determines past criminal activity by accessing database 131 (step 605).

At step 607, logic circuitry 107 determines a current incident type assigned to a public-safety officer and at step 609 logic circuitry 107 determines relevant criminal histories related to the current incident type. A determination is then made by logic circuitry 107 if any past criminal activity matches relevant criminal histories. If so, the logic circuitry 107 determines augmented-reality data based on any past criminal activity matching relevant criminal histories (step 611), and network interface 407 transmits the augmented-reality data to the device (step 613). As discussed above, the augmented reality data places a virtual object/shading near the individual if they have past criminal activity matching relevant criminal histories.

As discussed above, the augmented-reality data comprises a geometric shape, text, a color, and/or a shading. The augmented-reality data also comprises information that instructs the device to place a virtual object over or near the individual if the individual has past criminal activity that matches relevant criminal histories.

In the foregoing specification, specific embodiments have been described. However, one of ordinary skill in the art appreciates that various modifications and changes can be made without departing from the scope of the invention as set forth in the claims below. For example, while various components have been shown residing in dispatch center 114, one of ordinary skill in the art will recognize that these components may be place elsewhere in environment 100. For example, identity analysis circuitry 109 may lie within device 112. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a network interface configured to receive an image of an individual from a device;
   at least one database comprising facial information and criminal information;
   identity analysis circuitry configured to use the facial information and the criminal information for performing facial recognition on the image of the individual to determine an identity of the individual and that the individual has a past criminal activity;
   logic circuitry configured to:
      receive a current incident type (x) assigned to a public-safety officer;
      using the current incident type (x) to determine relevant criminal pasts (y) related to the current incident type (x), where y=f(x);
      determine if the individual's past criminal activity matches any of the relevant criminal pasts (y) related to the current incident type (x);
      determine augmented-reality data for the individual only if the individual's past criminal activity matches any of the relevant criminal pasts (y) related to the current incident type (x); and
   wherein the network interface is also configured to transmit any augmented-reality data to the device.

2. The apparatus of claim 1 wherein the network interface comprises a wired network interface.

3. The apparatus of claim 1 wherein the network interface comprises a wireless network interface.

4. The apparatus of claim 1 wherein the augmented-reality data comprises text, a geometric shape, a color, and/or a shading.

5. The apparatus of claim 1 wherein the augmented-reality data instructs the device to place a virtual object near the individual if the individual's past criminal activity matches any of the relevant criminal pasts (y) related to the current incident type (x).

6. An method comprising the steps of:
   receiving an image of an individual from a device;
   performing facial recognition on the image of the individual to identify the individual;
   determining a past criminal activity for the individual;
   determining a current incident type assigned to a public-safety officer;
   determining crimes relevant criminal pasts related to the current incident type;
   determining if the individual's past criminal activity is relevant to the current incident type by determining if the individual's past criminal activity matches any of the relevant criminal pasts related to the current incident type;
   determining augmented-reality data based on the individual's past criminal activity matching one of the relevant criminal pasts related to the current incident type; and
   transmitting any augmented-reality data to the device, wherein the augmented reality data places a virtual object/shading near the individual.

7. The method of claim 6 wherein the augmented-reality data comprises a geometric shape, text, a color, and/or a shading.

8. The method of claim 6 wherein the step of determining relevant criminal pasts (y) related to the current incident type (x) further comprises the step of accessing a table comprising the current incident type (x) and associated relevant criminal pasts (y) related to the current incident type (x).

9. A method comprising the steps of:
   receiving an image of an individual from a device;
   performing facial recognition on the image of the individual to identify the individual;
   determining a past criminal activity for the individual;
   determining a current incident type (x) assigned to a public-safety officer;
   determining relevant criminal pasts (y) related to the current incident type (x) where y=f(x);

determining if the individual's past criminal activity is relevant to the current incident type (x) by determining if the individual's past criminal activity matches any of the relevant criminal pasts (y) related to the current incident type (x);

determining augmented-reality data for the individual comprising text, shapes, colors, or shading based on the past criminal activity matching any of the relevant criminal pasts (y) related to the current incident type (x); and transmitting the augmented-reality data to the device, wherein the augmented reality data places a virtual object/shading near the individual if the past criminal activity matches any of the relevant criminal pasts (y) related to the current incident type (x), otherwise no virtual object/shading is placed next to the individual.

10. The apparatus of claim 9:

wherein the database comprises a table comprising the current incident type (x) and associated relevant criminal pasts (y) related to the current incident type (x).

11. The method of claim 9 wherein the step of determining relevant criminal pasts (y) related to the current incident type (x) further comprises the step of accessing a table comprising the current incident type (x) and associated relevant criminal pasts (y) related to the current incident type (x).

* * * * *